(12) United States Patent
Boul

(10) Patent No.: US 11,739,247 B1
(45) Date of Patent: Aug. 29, 2023

(54) EMULSION SHEAR BOND ENHANCED CEMENT

(71) Applicant: ARAMCO SERVICES COMPANY, Houston, TX (US)

(72) Inventor: Peter Boul, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/650,804

(22) Filed: Feb. 11, 2022

(51) Int. Cl.
| | |
|---|---|
| *C04B 28/04* | (2006.01) |
| *C09K 8/467* | (2006.01) |
| *C04B 24/42* | (2006.01) |
| *E21B 33/14* | (2006.01) |
| *C04B 40/00* | (2006.01) |
| *C04B 103/32* | (2006.01) |
| *C04B 103/00* | (2006.01) |

(52) U.S. Cl.
CPC ............ *C09K 8/467* (2013.01); *C04B 24/425* (2013.01); *C04B 28/04* (2013.01); *C04B 40/0046* (2013.01); *E21B 33/14* (2013.01); *C04B 2103/0093* (2013.01); *C04B 2103/32* (2013.01)

(58) Field of Classification Search
CPC ..................................................... C04B 7/345
See application file for complete search history.

(56) References Cited

U.S. PATENT DOCUMENTS

| | | |
|---|---|---|
| 2014/0367091 A1 | 12/2014 | Tour et al. |
| 2015/0072902 A1* | 3/2015 | Lafitte ................... C09K 8/035 |
| | | 507/112 |
| 2017/0327729 A1 | 11/2017 | Salla et al. |
| 2018/0223168 A1* | 8/2018 | Al-Yami ................ C09K 8/48 |
| 2018/0257989 A1 | 9/2018 | Shi et al. |
| 2019/0031950 A1 | 1/2019 | Bestaoui-Spurr |
| 2020/0011151 A1 | 1/2020 | Toews et al. |
| 2020/0063027 A1 | 2/2020 | Chopade et al. |

(Continued)

FOREIGN PATENT DOCUMENTS

| | | |
|---|---|---|
| CN | 111960711 A | 11/2020 |
| WO | 2013096990 A1 | 7/2013 |

(Continued)

OTHER PUBLICATIONS

Chuah et al.; "Nano reinforced cement and concrete composites and new perspective from graphene oxide", Construction and Building Materials; vol. 73, Dec. 30, 2014; pp. 113-124 (12 pages).

(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A precursor cement slurry includes a cement powder, water, and an additive. The additive includes a cement bond enhancer and a non-aqueous fluid additive. The non-aqueous fluid additive is an internal phase and the cement bond enhancer stabilizes the non-aqueous fluid additive in the form of a Pickering emulsion within the precursor cement slurry. The cement bond enhancer is comprised of the reaction product of graphene oxide with an anchoring functionality. A method of forming the precursor cement slurry and a method of cementing an annular space within a wellbore are also provided.

24 Claims, 3 Drawing Sheets

(56) References Cited

U.S. PATENT DOCUMENTS

2020/0231867 A1 7/2020 Bestaoui-Spurr et al.
2021/0003320 A1 1/2021 Toews et al.

FOREIGN PATENT DOCUMENTS

WO 2020153945 A1 7/2020
WO 2020257917 A1 12/2020

OTHER PUBLICATIONS

Babak et al.; "Preparation and Mechanical Properties of Graphene Oxide: Cement Nanocomposites", The Scientific World Journal; vol. 2014; Jan. 16, 2014; pp. 1-11 (11 pages).

Pal et al.; "Oil recovery mechanisms of Pickering nanoemulsions stabilized by surfactant-polymer-nanoparticle assemblies: A versatile surface energies' approach", Fuel; vol. 276; Sep. 15, 2020; pp. 1-15 (15 pages).

Ravi et al.; "Improve the Economics of Oil and Gas Wells by Reducing the Risk of Cement Failure", IADC/SPE 74497 Society of Petroleum Engineers; Feb. 26, 2002; pp. 1-13 (13 pages).

De Leon et al.; "Simultaneous Reduction and Functionalization of Graphene Oxide via Ritter Reaction", ACS Applied Materials & Interfaces; vol. 9; No. 6; pp. 14265-14272 (8 pages).

McGrail et al.; "Selective mono-facial modification of graphene oxide nanosheets in suspension", Chemical Communications; Issue 2; Oct. 26, 2015; pp. 288-291 (4 pages).

Pourhashem et al.; "Distinctive roles of silane coupling agents on the corrosion inhibition performance of graphene oxide in epoxy coatings", Progress in Organic Coatings; vol. 111; May 22, 2017; pp. 47-56 (10 pages).

Xue et al.; "Corrosion Protective Properties of Silane Functionalized Graphene Oxide Film on AA2024-T3 Aluminum Alloy", Journal of The Electrochemical Society; vol. 163; No. 13; Oct. 7, 2016; pp. C798-C806 (9 pages).

Bhowmik et al.; "Covalently functionalized reduced graphene oxide by organically modified silica: a facile synthesis of electrically conducting black coatings on glass", Journal of Materials Chemistry; vol. 22; Issue 47; Sep. 21, 2012; pp. 24690-24697 (8 pages).

Lee et al.; "Using silane-functionalized graphene oxides for enhancing the interfacial bonding strength of carbon/epoxy composites", Composites: Part A; vol. 75; May 2, 2015; pp. 11-17 (7 pages).

* cited by examiner

EMULSION SHEAR BOND ENHANCED CEMENT

BACKGROUND

Well cementing is the process of placing a cement sheath around a casing string in a downhole environment. The cement sheath must maintain well integrity behind the casing and provide long-term zonal isolation to ensure safety and prevent environmental problems.

Different cement types and formulation may be tailored to individual wells depending on a variety of situations, including, but not limited to, formation composition, for example, sandstone, clay, and shale; formation porosity; water content; formation pressure; reservoir temperature; and anticipated wellbore fluid compositions. In some instances, additives are included in cement formulations to seal off certain zones, such as water-producing zones and lost circulation zones. Other additives may accelerate the cement hardening process and prevent washout of the cement upon positioning, for example. Changes to the position of the wellbore, for example, from a substantially vertical orientation to one that is closer to horizontal, and transitioning from a greater diameter casing to a smaller diameter casing, may require changes to cement attributes, for example, setting times, curing rate, and viscosity of the slurry.

While greater control may be had closer to the conductor and surface casing in the annulus space by circulation, the properties of the cement becomes harder to control the farther the wellbore extends from the surface well pad. Some producing wellbores are known to extend as far as 30 kilometers (km) from their surface entry point. After the drilling has commenced, production casing is typically set into place with cementing at the production zone. Deviation from the vertical can be handled using casing centralizers to ensure that cement will surround the casing. Typically, the sealing quality of this casing-cementing completion phase provides an important hydraulic barrier for in both vertical and horizontal wellbore configurations. Any potential fluid migration through cement sealing barriers may be evaluated initially with geophysical logs, including acoustic cement bond logs (CBL) and variable density logs (VDL). These logs give a sense of the degree of bonding made between the cement and the wellbore wall.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed relate to a precursor cement slurry, comprising a cement powder, water, and an additive. The additive includes a cement bond enhancer and a non-aqueous fluid additive. The non-aqueous fluid additive is an internal phase and the cement bond enhancer stabilizes the non-aqueous fluid additive in the form of a Pickering emulsion within the precursor cement slurry. The cement bond enhancer is comprised of the reaction product of graphene oxide with an anchoring functionality.

In another aspect, embodiments disclosed relate to a method of forming a precursor cement slurry. The method comprises introducing into a cement powder a dry additive that is not a cement bond enhancer such that a dry mixture forms, introducing a water-soluble fluid additive and the cement bond enhancer into a water such that a wet suspension forms, where the cement bond enhancer is comprised of the reaction product of graphene oxide with an anchoring functionality, introducing a non-aqueous fluid additive into the wet suspension such that a Pickering emulsion forms, where the non-aqueous fluid additive is an internal phase and the cement bond enhancer stabilizes the non-aqueous fluid additive and, and introducing the dry mixture into the Pickering emulsion such that the precursor cement slurry forms.

In yet another aspect, embodiments disclosed relate to a method for cementing an annular space within a wellbore. The method comprises introducing a precursor cement slurry into the wellbore such that it is positioned in an annular space in wellbore, and maintaining the wellbore such that the precursor cement slurry cures into a product cement in the annular space. The precursor cement slurry comprises a cement powder, water, and an additive. The additive includes a cement bond enhancer and a hydrocarbon solvent. The hydrocarbon solvent is an internal phase and the cement bond enhancer stabilizes the hydrocarbon solvent in the form of a Pickering emulsion within the precursor cement slurry. The cement bond enhancer is comprised of the reaction product of graphene oxide with an anchoring functionality.

In yet another aspect, embodiments disclosed relate to a product cement comprising a cement bond enhancer reacted with both a surface and a component in the cement matrix. Other aspects and advantages of the claimed subject matter will be apparent from the following description and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

Figure 1:
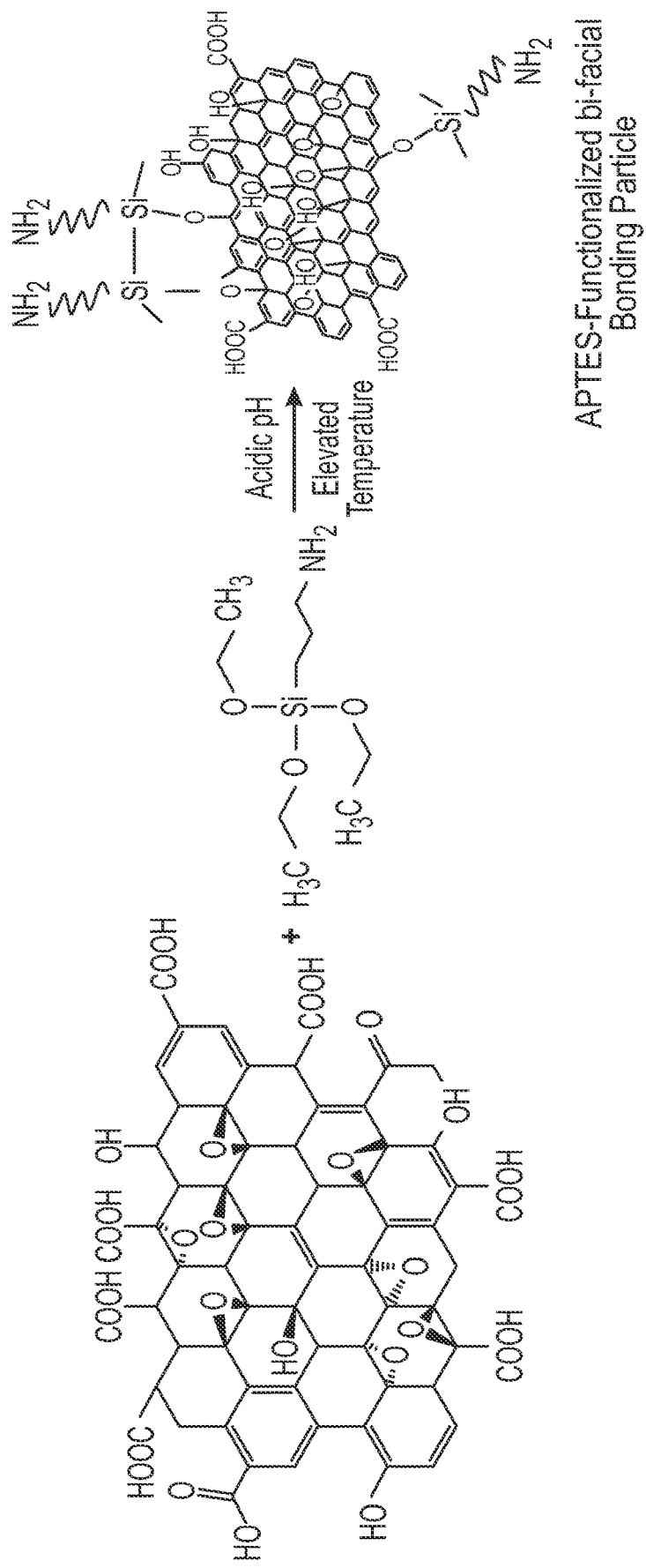
FIG. 1 is a representation of a reaction involving functionalization of graphene oxide with a silane to form a bi-facial cement bond enhancer.

Typically, down is toward or at the bottom and up is toward or at the top of the figure. "Up" and "down" are oriented relative to a local vertical direction. However, in the oil and gas industry, one or more activity takes place in a vertical, substantially vertical, deviated, substantially horizontal, or horizontal well. Therefore, one or more figure may represent an activity in deviated or horizontal wellbore configuration. "Uphole" may refer to objects, units, or processes that are positioned closer to the surface entry in a wellbore. "Downhole" may refer to objects, units, or processes that are positioned farther from the surface entry in a wellbore.

DETAILED DESCRIPTION

Long-term changes in the cement bond strength are not easily monitored during production. Often, this long-term bonding concern is overlooked in the design of the cement, especially with respect to the thermo-mechanical stresses between the formation and the casing during the life cycle of the well. Different temperature fluids, including formation waters and hydrocarbons, may contact the solidified cement and casing, which may cause stress as each has different rates of expansion and contraction when exposed to changing temperatures.

The wellbore can contain one or more steel casings, forming annuli between both sets of the casings and a casing and a wellbore wall. Each may contain a cement sheath. The cement sheath can experience stresses and annular pressure buildup due to, for example, gas or fluid flow through microchannels in the annulus, forming microannuli, and fractures (for example, microfractures), cracks, and clefts within or around the cement sheath, the casing, or the production tube. This can result in a deterioration of the mechanical properties of the cement and lead to formation of micro-cracks and fractures, which affect the production and increase the cost of operation.

The strength of the interface at the cement with the casing is a critical factor in the long-term productivity of an oil or gas well. Wells with poor cement slurry design may negatively impact the long-term bond between the casing and the cement. Poor cement-casing may result in premature water production that may limit the economic life of the well. Where de-bonding occurs between the cement and the casing in casing-casing seals, annular pressure build-up (APB) is known to occur. Remediation where hydrocarbons are bypassing the production tube typically requires expensive remedial work to repair. If not rapidly and properly treated, such damage may result in closing and abandoning the well not only due to hydrocarbon production issues but also safety to operating personnel.

Embodiments disclosed have found that interfacial adhesion between the cement and steel casing can be strengthened at the cementing stage by utilizing nanomaterials in the form of cement bond enhancers that are introduced as part of the cement slurry. The nanomaterials may be part of a "Pickering emulsion" that migrates to the interface of the cement and the casing or the cement and the wellbore wall. Pickering emulsions are a type of emulsion that is stabilized by solid particles that absorb onto the interface between two phases, such as an aqueous liquid phase and a non-aqueous liquid phase. As used throughout this disclosure, the "internal phase" refers to droplets of a liquid phase (such as a non-aqueous phase) that are emulsified in a continuous phase of different polarity (such as an aqueous phase). Embodiments disclosed describe short-term and long-term properties can be tailored towards high production lifetime of the wells. These nanomaterials may be functionalized for stability of the droplets in the cement slurry as well as adherence to the surface of carbonized steel and formation materials.

Cement Bond Enhancer

The cement bond enhancer is the reaction product of graphene oxide with an anchoring functionality. One or more embodiments may include cement bond enhancer that are mono-facial bi-facial, or a combination of both mono-facial and bi-facial particles. "Mono-facial" means that one side of a graphene oxide particle is grafted with an anchoring compound and the other side is not. In such embodiments, graphene oxide particle has a "Janus-like" structure due to the difference in functionality of the grafted side and the non-grafted graphene oxide side. "Bi-facial" means that both sides of the dual-sided graphene oxide particle are grafted with an anchoring compound. In such embodiments, the cement bond enhancer is a "non-Janus" particle if the grafted material is the same on both sides; if not, then it is a "Janus" particle. In the non-Janus case, both sides have similar chemical and physical functionality.

Graphene is a known solid lubricant. However, when graphene is applied directly to surfaces, such as casing or formation materials, its weak adherence to metal surfaces limits its effectiveness for bonding. Graphene may detach from metallic surfaces, exposing the surface to corrosive environments and delaminating other materials, such as cements and adhesives, that may be bonded with the graphene.

The cement bond enhancer comprises a reaction product with graphene oxide, the oxidized derivative of graphene. The graphene oxide particles used in one or more embodiments may be an appropriate size for use as part of a cement bond enhancer. For example, the graphene may have a thickness in a range of from about 0.5 to 20 nm (nanometers), a length in a range of from about 1.0 nm to 50 μm (micrometers), and a width in a range of from about 1.0 nm to 50 μm; however, this may vary according to the needs of the application.

The graphene oxide used for one or more embodiments may be an appropriate shape for use as part of a cement bonding agent. For example, graphene oxide particles may be flat or non-flat sheets that are in common geometric shapes, such as circular, square, and triangular forms. Geometric and non-geometric configurations are not limited except as to provide for a surface for grafting with a polymer. For example, the graphene oxide may have a slightly parabolic shape such as to mimic or conform to the shape of a material in the wellbore, such as the exterior or interior surface of a casing or pipe, or the interior surface of a wellbore wall. Other configurations are possible and envisioned as part of one or more embodiment.

Graphene oxide used for fabrication of the embodiments of the cement bond enhancer may have appropriate surface chemistry for use as an adhesion agent in a water-based fluid. In one or more embodiments, the graphene oxide surface is hydrophilic, meaning the graphene oxide surface has a water contact angle of less than 90°.

The one or more embodiment cement bond enhancer also includes an anchoring functionality that is bonded to one or both sides of the graphene oxide particle. The anchoring functionality may be made from any anchoring compound that is configured to graft with a graphene oxide particle and to adsorb onto a surface, such as onto the surface of a casing, a pipe, a conduit, a tool, a formation, or a wellbore wall using an "anchoring functional group".

The anchoring functionality is a portion of the anchoring compound that is configured to adsorb via physisorption or chemisorption onto a surface such that the one or more embodiment bonding particles adheres to the surface. Physisorption means that relatively weak interactions, such as electrostatic interactions or Van der Waals forces, occur between the anchor compound and the surface. Chemisorption means that stronger interactions between the anchoring functionality and the surface take place. Chemisorption may be characterized as reactive, meaning at least one chemical bond is formed between the anchoring functionality and the surface, or non-reactive, where the anchoring functionality strongly adsorbs to the surface without forming a chemical bond.

Considering the anchoring functionality, it is noted that metal surfaces on downhole surfaces, for example, casing, production tube, and piping may be composed of a variety of materials including, but not limited to, metallic materials, such as metals (for example, carbon steel, chrome steels, titanium) and non-metallic materials (for example, composites, like carbon fiber, metal oxides, polymers, and various composites thereof). As well, wellbore walls and formation materials may be comprised of a variety of materials, including slate, sandstone, and limestone, which commonly contain both metals and non-metals intermingled. Generally, adsorption onto a surface is strong enough for the bonding particle that the anchor groups are not labile under formation conditions, meaning they will not readily be displaced from the surface.

In one or more embodiments, the anchoring compound may be a silane compound. The anchor functionality for the one or more embodiment bonding particles may include an amino functionality. The anchor functionality for one or more embodiments anchoring compounds may be a glycidyl functionality. Embodiment compounds that include silane functionality, including, but are not limited to, (3-aminopropyl)triethoxysilane (APTES) and (3-glycidyloxypropyl) trimethoxysilane (GPTMS).

The anchoring compound may be grafted to the graphene oxide surface by reaction with an oxygen-based species on the graphene oxide surface, such as an alcohol, a ketone, or an oxide functionality on the graphene oxide surface. The reaction forms a covalent bond between the graphene oxide particle and the anchor compound, forming the cement bond enhancer.

FIG. 1 is a representation of a reaction involving functionalization of graphene oxide with a silane to form a bi-facial cement bond enhancer. FIG. 1 shows the general reaction scheme of APTES, a silane compound with an amino anchoring functionality, with a form of graphene oxide (GO).

Figure 2:
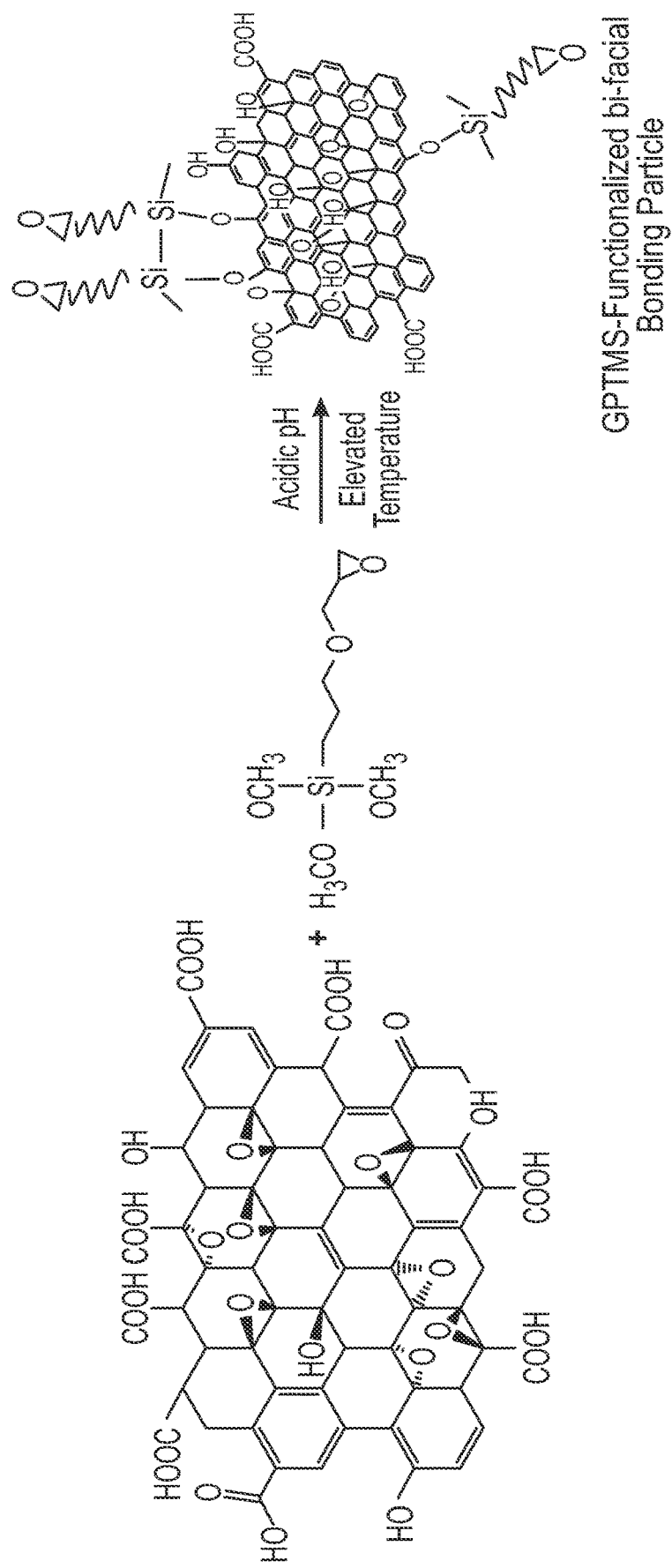
FIG. 2 is a representation of a reaction involving functionalization of graphene oxide with a silane to form a bi-facial cement bond enhancer.

FIG. 2 is a representation of a reaction involving functionalization of graphene oxide with a silane to form a bi-facial cement bond enhancer. FIG. 2 shows the general reaction scheme of GPTMS, a silane compound with a glycidyl anchoring functionality, with a form of GO.

In the reactions presented in FIGS. 1 and 2, the GO and the anchoring compound reacts at the siliane functionality to form the cement bond enhancer. The reaction occurs at acidic conditions (pH less than 7) and at a temperature greater than room temperature (>20° C.). In FIG. 1, APTES is bonded with the GO to form an APTES-functionalized bi-facial bonding particle. In FIG. 2, GPTMS is bonded with the GO to form an GPTMS-functionalized bi-facial bonding particle.

The following examples are merely illustrative and should not be interpreted as limiting the scope of the present disclosure.

20 mL (milliliters) of graphene oxide GO-V50 1 wt. % (weight percent) suspension (Standard Graphene; San Francisco, CA) is dispersed in an ethanol/water mixture (3:1 volume:volume ratio) using a probe sonicator for 40 minutes. About 1.2 grams (g) of GPTMS in 3.5 milliliters (mL) was drop-wise added into the suspension under stirring. An amount of acetic acid was added until the pH was reduced to about 3, forming a reactive suspension. The reaction was left stirring at 65 to 70° C. for about 72 hours. The general reaction scheme follows the pathway given in FIG. 2.

After centrifuging and washing the reaction product with alcohol reagent four times, the resultant was rotary-evaporated and dried overnight in a vacuum oven. An amount of GPTMS-GO-GPTMS bi-facial cement bond enhancer was recovered. The composition of the final product was confirmed using Raman spectroscopy, which indicated the attachment of a chemical functional group onto the graphene oxide surface. The composition was additionally confirmed by thermal gravimetric analysis, showing weight loss from the functionality grafted to the graphene oxide.

While the particular example described here is a bi-facial cement bond enhancer, a mono-facial cement bond enhancer made also be made and used. In one or more embodiments, a similar synthesis method to the previously described method may be used. However, one side of the graphene oxide particle may be covered or protected such that anchoring functionality does not graft to one side of the graphene oxide.

Precursor Cement Slurry

One or more embodiments may include a precursor cement slurry that comprises the cement bond enhancer as previously described. The precursor cement slurry forms when both dry and wet components are combined to form the slurry. A non-aqueous fluid additive, such as a hydrocarbon solvent, is an internal phase and the cement bond enhancer as previously described stabilizes the hydrocarbon solvent in the form of a Pickering emulsion within the precursor cement slurry. The precursor cement slurry cures into a resultant cement product.

As used in this disclosure, a "cement" is a binder, for example, a substance that sets and forms a cohesive mass with measurable strengths. A cement can commonly be characterized as non-hydraulic or hydraulic, as will be described further in discussion of its several components.

As used in this disclosure, the term "set" can mean the process of a cement slurry becoming a hard solid through a chemical reaction between slurry components. This reaction may be called "curing the cement" or simply "curing". Depending on the composition and the conditions, curing can take just a few minutes up to 72 hours or longer for some cement compositions to initially set.

A precursor cement slurry comprises different materials that are used to give certain properties for performance improvement. A cement slurry consists of three elements. The first element of the cement system is cement powder (for example, a Portland cement), which is made up of chemical compounds, such as calcium silicate, calcium aluminate, and other oxide components. The cement powder is the main element of the cement slurry as it provides many of the properties of the set cement product.

The cement powder may be any suitable material that when mixed with water may set into a cement product. The cement powder material may be hydraulic or non-hydraulic. A hydraulic cement precursor material refers to a mixture of limestone, clay, and gypsum burned together at temperatures greater than 1000° C. that may begin to harden instantly or within a few minutes while in contact with water. Hydraulic cements (for example, Portland cement) harden because of hydration, which uses only water in addition to the cement powder to achieve curing of the cement. The cement hydration products, chemical reactions that occur independently of the water content of the slurry, can harden even underwater or when constantly exposed to wet weather. The chemical reaction that results when the dry cement powder is mixed with water produces hydrates that are water-soluble.

A non-hydraulic cement powder material refers to mixtures of lime, gypsum, plasters, and oxychloride. A non-hydraulic cement precursor may take longer to harden or may require drying conditions for proper strengthening, but often is more economically feasible. Non-hydraulic cements (for example, Sorel cements) harden because of the formation of complex hydrates and carbonates. Such cement powders may require more than water to achieve setting, such as carbon dioxide or mixtures of specific salt combinations. Additionally, too much water cannot be present. The set material should be present in non-aqueous environment to retain integrity and strength. A non-hydraulic cement produces hydrates that are not resistant to water.

Any cement powder can be used in the compositions of the present application. A hydraulic or non-hydraulic cement powder may be chosen based on the desired application of the cement slurry. In one or more embodiments, the cement powder may be Portland cement precursor, for example, API Class G or Saudi Class G Portland Cement. A Portland cement powder is a hydraulic cement powder (cement precursor material that not only hardens by reacting with water but also forms a water-resistant product) produced by pulverizing clinkers. Clinkers contain hydraulic calcium silicates and one or more of the forms of calcium sulfate as an inter-ground addition.

The cement powder may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$), sodium oxide, potassium oxide, limestone, lime (calcium oxide), hexavalent chromium, trivalent chromium, calcium aluminate, silica sand, silica flour, hematite, manganese tetroxide, other similar compounds, and combinations thereof. The cement powder material may include Portland cement, siliceous fly ash, calcareous fly ash, slag cement, silica fume, quartz, any known cement precursor material, and combinations thereof. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The cement powder may include a API (American Petroleum Institute) grade cement. API Class A, B, C, and D cement powders are products obtained by grinding Portland cement clinker and, if needed, calcium sulfate, as an inter-ground additive. Processing additives can be used in the manufacture of cement of these classes. Suitable set-modifying agents can be inter-ground or blended during manufacture of Class D cement. API Class G and H cement powders are for well cements. API Class G and H cement powders are the products obtained by grinding clinker with no additives other than one or more forms of calcium sulfate, water, or chemical additives as required for chromium (VI) reduction. API Class G and H cement powders may also be graded as "moderate sulfate-resistant" (MSR) or "high sulfate-resistant" (HSR). Cements made from such powders are useful to prevent deterioration of set cement in downhole environments caused by sulfate attack from formation waters. Additional information is available in *Specification for Cements and Materials for Well Cementing*, American Petroleum Institute, Twenty-Fifth ed., inc. Addendum (Mar. 1, 2019), which is incorporated by reference in its entirety.

The cement powder may include a Saudi Class G cement powder. Portland Saudi cement type-G powder complies with API classification standards. The Portland Saudi cement type-G powder is suited for high pressure/high temperature (HPHT) downhole applications.

A Saudi cement powder used as part of one or more embodiments may include a combination of a Portland cement powder, such as an API Class G cement powder, and crystalline silica, also known as quartz. Saudi Class G cement may include from 60 to 100 wt. %, from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 wt. % Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica or quartz.

Saudi Class G cement powder may have a pH of greater than 7, such as from 8 to 14, or from 10 to 13, or from 11 to 13, or from 12 to 13, or of about 12.4.

Saudi Class G cement may have a bulk density at 20° C. in a range of from about 70 to 120 lb/ft$^3$, such as from about 80 to 110 lb/ft$^3$, or from about 90 to 100 lb/ft$^3$, or of about 94 lb/ft$^3$.

Saudi Class G cement powder may have a solubility in water in a range of from about 0.1 to 2 grams per 100 milliliters (g/100 mL), such as from about 0.1 to 1 g/100 mL, or from about 0.1 to 0.8 g/100 mL, or from about 0.1 to 0.5 g/100 mL, or from about 0.2 to 2 g/100 mL, or from about 0.2 to 1 g/100 mL, or from about 0.2 to 0.8 g/100 mL, or from about 0.2 to 0.5 g/100 mL, or from about 0.4 to 2 g/100 mL, or from about 0.4 to 1 g/100 mL, or from about 0.4 to 0.8 g/100 mL, or from about 0.4 to 0.5 g/100 mL, or from about 0.5 to 2 g/100 mL, or from about 0.5 to 1 g/100 mL, or from about 0.5 to 0.8 g/100 mL, or of about 0.5 g/100 mL.

The second element of the precursor cement slurry is water. The cement powder is mixed with water to provide fluidity to the slurry and act as the hydration agent to the cement powder. The water-to-cement ratio is specific to the type of cement powder. Too low of a water-to-cement ratio results in an elevated cement slurry viscosity and rate of set; too high of a water-to-cement ratio may cause free water separation and a reduction in cement density. Either ratio in a downhole application, such as cementing the annulus between a metal sheath and wellbore or between two metal sheaths, may cause issues requiring time-consuming remediation that results in hazardous operations and potential lack of well control.

The water may comprise one or more known compositions of water, including, but not limited to, distilled; condensed; filtered or unfiltered fresh surface or subterranean waters, such as water sourced from lakes, rivers or aquifers; mineral waters; gray, brown, black, and blue; run-off, storm or waste; potable or non-potable; synthetic or natural brackish; synthetic or natural sea; synthetic or natural brines; formation; production or produced; boiler feed; and condensate water; and combinations thereof. The water may include impurities, including, but not limited to, ions, salts, minerals, polymers, organic chemicals, inorganic chemicals, detritus, flotsam, debris, and dead and living biological life forms, so long as the purpose and performance of the cement slurry is not mitigated or otherwise detrimentally affected.

Increasing the saturation of the water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In one or more embodiments, the amount of water in the precursor cement slurry may be in a range of from about 10 to 70% BWOC (percent by weight of the cement), such as from about 10 to 60% BWOC, or from about 10 to 50% BWOC, or from about 20 to 50% BWOC, or from about 30 to 50% BWOC, or from about 35 to 45% BWOC, or about 44% BWOC.

The third element of the precursor cement slurry is one or more slurry additives, such as chemical and physical additives. Such slurry additives may modify physical, chemical, or both properties of the cement slurry, such as the flow, adhesion, fluid loss, and curing rate of the cement slurry. Such slurry additives may also impact the properties of the resultant set cement versus a similar cement slurry and set cement without such additives, including tensile strength, compressive strength, and density. The one or more additives may be any additives known to be suitable for cement slurries, including, but not limited to, dispersants, accelerators, retarders, extenders and expanders, antifoamers, thermal stabilizers, surfactants, weighting agents, fluid loss control agents, lost circulation control agents, surfactants, antifoaming agents, specialty additives, such as polymer elastomers or fibers, and combinations thereof.

As used in this disclosure, the term "polymer" can refer to a molecule having at least one repeating unit. A polymer includes homopolymers and heteropolymers with multiple types of monomer units, such as bi-, tri-, and tetra-polymers.

In one or more embodiments, the precursor cement slurry may include a polymer additive. An example of a polymer additive includes a non-ionic cellulose derivative, such as hydroxyethyl cellulose (HEC). HEC is water-soluble, so it should blend with the water-phase of any cement slurry with a non-water emulsion component.

Since cement tends to fracture under downhole conditions due to the brittleness of the cement in a neat form, polymeric additives, including polymeric and organic-inorganic hybrid material-based additives, have been added to the cement in an attempt to improve the elastic properties. Generally, the polymeric additives bind cement particles through weak physical bonding, for example, electrostatic or hydrogen bonding, improving the mechanical stability of the set cement. The polymeric additives tend to allow for uniform distribution of stresses experienced in the cement matrix, such as by those through thermal differences or sheer, thus enhancing the resistance to the formation of large conductive fracturing. The polymeric additive may substantially improve the tensile properties of the cement; however, in some instance, the polymer may reduce compressive strength.

In addition to impacting the properties of the set cement, a polymer additive may also affect the movement and positioning of the cement slurry as well. For example, a polymer may modify the rheology of the cement slurry, permitting the polymer to flow smoothly and with a uniform consistency. In addition, a polymer may also act as a fluid loss additive, that is, prevent the loss or separation of water from the cement slurry when the slurry is positioned and undergoing the curing process.

In one or more embodiments, the amount of polymer in the precursor cement slurry may be in a range of from about 0.05 to 5.0% BWOC, such as from about 0.05 to 4.5% BWOC, or from about 1.0 to 4.0% BWOC, or from about 1.5 to 3.5% BWOC, or from about 2.0 to 3.0% BWOC.

As used throughout, a "superplasticizer" refers to a cement slurry additive that includes chemical compounds that enable the production of a resultant hardened concrete, hardened cement, or a hardened mortar, that uses at least 15% less water than a similarly-formulated cement slurry that does not use a superplasticizer.

In one or more embodiments, the precursor cement slurry may include a superplastizer. Useful examples of superplasticizers include, but are not limited to, Ethacryl G (Arkema; Colombes, France), ADVA XT2 (W.R. Grace and Co.; Columbia, Md.), ADVA 600 (W.R. Grace and Co), and ADVA 198 (W.R. Grace and Co.).

A superplasticizer may improve the flow characteristics and consistency of the cement slurry as it traverses through piping and annulus in being positioned in a wellbore. The superplasticizer may reduce the plastic viscosity of the cement slurry, minimize or prevent clumping in the cement slurry, and improve the consistency and flow of the cement slurry over a prolonged period as it is introduced into and positioned in the wellbore. The superplasticizer used in the cement slurry may decrease the cohesive forces between the cement slurry particles, thereby reducing yield stress. This may result in better extrusion at lower pumping pressure while reducing the likeliness of settling, such as when the cement slurry passes through a pump or around the edge of a casing string to enter an annular void.

In one or more embodiments, the precursor cement slurry may include a non-aqueous fluid additive. The non-aqueous fluid additive is present as an internal phase of a Pickering emulsion that is mixed with dry cement components to form a cement mixture. As the internal phase, the non-aqueous fluid is in the form of droplets that are emulsified in an aqueous phase. The previously described cement bond enhancer particles gather at the interfaces of the non-aqueous fluid and the aqueous fluid to form the Pickering emulsion. The glycidyl ether functionalities from the droplets may then be crosslinked in the presence of a curing agent. A polymer with glycidyl ether functionality crosslinks with the amine to render a network polymer. Appropriate curing agents may include aliphatic amines, polyamides, cycloalphatic amines, and aromatic amines. Other preferred examples of amines are such compounds as polyethylene glycol diamine, polyethylene glycol triamine, polypropylene glycol diamine, and polypropylene glycol triamine.

Useful examples of non-aqueous fluid additives include, but are not limited to, ADVASOL® HAD (Monument Chemical; Indianapolis, Ind.), which is a highly aromatic refined naphtha having carbon numbers predominantly in the C9-17 range, including 1,2,3,4-tetrahydronaphthalene (also known as tetralin), naphthalene, ethylbenzene, styrene, and benzene.

The combination of nanodroplets of the non-aqueous fluid additive in the cement slurry and the nanoparticles of cement bond enhancer are configured such that nanoparticles in the cement slurry are present in the form of a Pickering emulsion. That is, the non-aqueous fluid additive forms an interior spheroid phase and is stabilized within the water-based cement slurry by being surrounded by a layer of solid cement bonding enhancer nanoparticles. Further information will be provided about the formation of the Pickering nanoparticles in describing the method of formation of one or more embodiments of the cement slurry.

In one or more embodiments, the total amount of additives in the precursor cement slurry may to be in a range of from about 0.001 to 10% BWOC, such as from about 0.001 to 8% BWOC, or from about 0.001 to 5% BWOC, or from about 0.001 to 3 wt. % BWOC, or from about 0.001 to 1 wt. % BWOC, or from about 0.01 to 10% BWOC, of from about 0.01 to 8% BWOC, or from about 0.01 to 5% BWOC, or from about 0.01 to 3% BWOC, or from about 0.01 to 1% BWOC, or from about 0.1 to 10% BWOC, or from about 0.1 to 8% BWOC, or from 0.1 to 5% BWOC, or from about 0.1 to 3% BWOC, or from about 0.1 to 1% BWOC.

The one or more embodiments, the cement slurry may have a density in a range of from about 110 to 170 lb/ft$^3$, such as from 110 to 160 lb/ft$^3$, or from 110 to 150 lb/ft$^3$, or from 110 to 140 lb/ft$^3$, or from 110 to 130 lb/ft$^3$, or from 110 to 120 lb/ft$^3$, or from 120 to 170 lb/ft$^3$, or from 120 to 160 lb/ft$^3$, or from 120 to 150 lb/ft$^3$, or from 120 to 140 lb/ft$^3$, or from 120 to 130 lb/ft$^3$, or from 130 to 170 lb/ft$^3$, or from 130 to 160 lb/ft$^3$, or from 130 to 150 lb/ft$^3$, or from 130 to 140 lb/ft$^3$, or from 140 to 170 lb/ft$^3$, or from 140 to 160 lb/ft$^3$, or from 140 to 150 lb/ft$^3$, or from 150 to 170 lb/ft$^3$, or from 150 to 160 lb/ft$^3$, or from 160 to 170 lb/ft$^3$.

Figure 3:
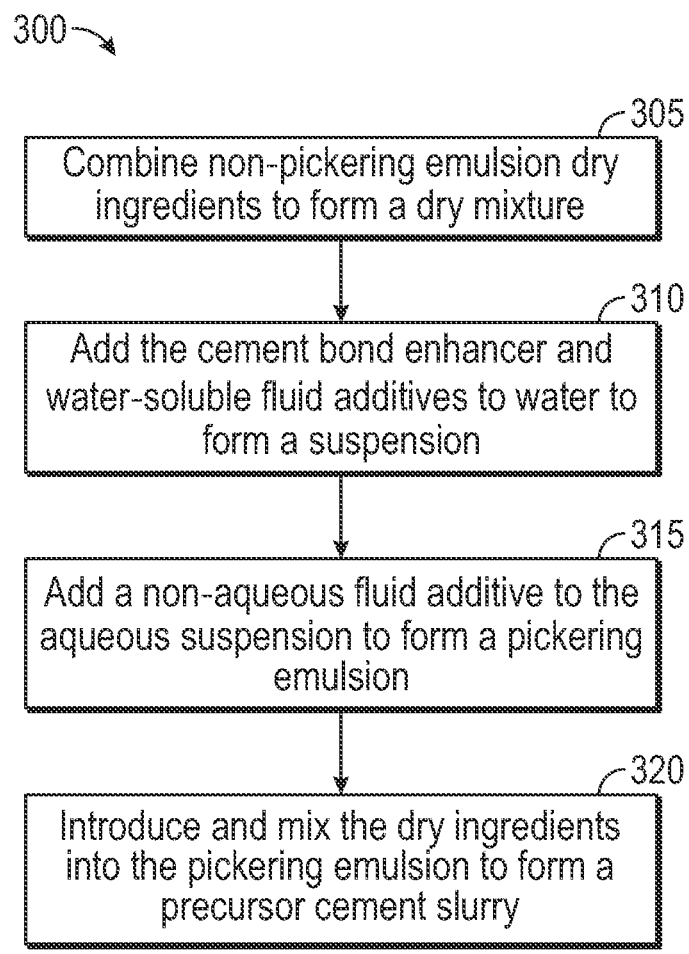
FIG. 3 is a flowchart depicting a method for utilizing nanoparticle cement bond enhancers to form a precursor cement slurry with a Pickering emulsion according to one or more embodiments.

One or more embodiments relate to forming the precursor cement slurry. The method of forming the precursor cement slurry utilizes the cement bond enhancer to form a Pickering emulsion. An embodiment of the method is provided in FIG. 3. FIG. 3 is a flowchart depicting a method for utilizing nanoparticle cement bond enhancers to form a precursor cement slurry with a Pickering emulsion according to one or more embodiments.

Method 300, which is shown in FIG. 3, may include combining the non-Pickering emulsion dry ingredients to form a dry mixture 305. For example, a cement powder and a dry additive that is not a cement bond enhancer, such as a polymer additive, may be separately measured, introduced to one another, such as by introducing the dry additive into the cement powder, shaken in a closed container or vessel, and then vortex mixed to ensure that the dry additive is distributed thoroughly in the cement powder and form a dry mixture. Other dry additives that are not the cement bond enhancer may be combined at this stage of the process. The polymer additive may be included in an amount ranging from about 0.05 to 5.0% BWOC.

The cement bond enhancer is not pre-blended with other dry ingredients to form the dry mixture. This permits the cement bond enhancer to be present in a wet suspension such that upon mixing of the hydrocarbon solvent into the wet suspension the cement bond enhancer may stabilize the hydrocarbon solvent as the internal phase of a Pickering emulsion. Adding the cement bond enhancer to the other dry ingredients may too finely distribute the cement bond enhancer to permit the formation of the Pickering emulsion upon combining the dry mixture and wet emulsion.

Method 300 may include adding the cement bond enhancer and water-soluble fluid additives to into the water to form a suspension of cement bond enhancer in a wet suspension 310. For example, an amount of the cement bond enhancer may be added to amounts of the superplasticizer additive and water, and then sonicated to distribute the cement bond enhancer thoroughly throughout and form a wet suspension. The cement bond enhancer is as previously described. The cement bond enhancer may be included in an amount ranging from about 0.05 to 5.0% BWOC. The superplasticizer may be included in an amount ranging from about 0.05 to 2.0% BWOC. The amount of water may be appropriately selected based upon the cement composition as previously described.

In some instances, the pH may be adjusted to stabilize the aqueous suspension. In one or more embodiments, the pH may be adjusted to a range of from about 8 to 13.

Method 300 may include adding a non-aqueous fluid additive to the aqueous suspension and forming a Pickering emulsion 315. For example, an amount of a non-aqueous fluid additive, such as a hydrocarbon solvent, may be added to the aqueous suspension and then sonicated. The sonification of the non-aqueous fluid additive in the aqueous suspension causes the non-aqueous fluid additive to break apart into nanodroplets. The aqueous suspension, already having cement bond enhancer present, forms a Pickering emulsion with the energization of sonic mixing. In the Pickering emulsion, the non-aqueous fluid additive is internal phase, and the nanosolid cement bond enhancers stabilizes the outer surface of the hydrocarbon nanobubbles.

Method 300 may include introducing and mixing the dry mixture into the Pickering emulsion and forming the precursor cement slurry 320. The Pickering emulsion may be placed in a blender at a reduced mixing setting and allowed to continue mixing. Under these conditions the dry mixture may be added piecemeal into the Pickering emulsion to ensure that the dry ingredients are fully incorporated and whetted by the Pickering emulsion. After all the ingredients are added, the blender speed may be elevated for a short period to fully incorporate all the ingredients together into the precursor cement slurry.

The following examples are merely illustrative and should not be interpreted as limiting the scope of the present disclosure.

An example precursor cement slurry is provided. For the dry ingredients, 42.11 grams (g) of Saudi class G Portland cement and 0.053 g (0.126% BWOC) of polymer additive (for example, hydroxyethyl cellulose; FSA-3 hydroxyethyl cellulose; Fritz Industries; Mesquite, Tex.; or FWCA Cement Additive; Halliburton; Duncan, Okla.) are introduced into a container, are hand-shaken, and then vortex mixed to distribute the polymer additive throughout the cement powder and form a dry blend.

40 milligrams (mg) of superplasticizer additive (0.095% BWOC), 4.21 mg of cement bond enhancer (GO/GO-GPTMS, which is a 1:10 weight ratio mixture of GO to GO-GPTMS) (0.010% BWOC), and 18.65 g of tap water (44.3% BWOC) were added to a second container and sonicated for about 20 minutes to form an aqueous suspension of cement bond enhancer. The pH was adjusted to 10.

To the aqueous suspension of cement bond enhancer 2.1 milliliters (mL) of non-aqueous fluid additive (ADVASOL® HAD) was introduced into the aqueous suspension of cement bond enhancer and then sonicated for about 20 minutes until the Pickering emulsion formed.

The dry mixture was piecemeal introduced into the Pickering emulsion at a reduced blend setting to ensure the dry ingredients were fully incorporated and whetted. Upon full incorporation, the blend speed setting was elevated for 35 seconds to mix the formed Example 1 Precursor Cement Slurry. Example 1 Precursor Cement Slurry had a density of 15.8 pounds per gallon.

A second example precursor cement slurry is provided. To form Example 2 Precursor Cement Slurry, the same general procedure is followed except that 8.42 mg (0.020% BWOC) of cement bond enhancer (GO-GPTMS) and 4.2 mL of non-aqueous fluid additive are used to form the Pickering emulsion. As well, 50 mg (0.119% BWOC) of superplasticizer additive is used to form the Example 2 Precursor Cement Slurry. Example 2 Precursor Cement Slurry had a density of 15.8 pounds per gallon.

A comparative example precursor cement slurry is provided. To form the Comparative Example, the same general procedure is followed except with only three ingredients: 42.11 g of Saudi class G Portland cement, 0.053 g of polymer additive, and 18.65 g of water. The Comparative Example Cement Slurry has a density of about 15.8 pounds per gallon (1.89 grams per cubic centimeter).

Example 1, Example 2 and the Comparative Example were each coated onto an iron steel plate. The coated cement slurry samples were then allowed to cure for 72 hours in a humidified chamber to prevent evaporation of water from the cement. After curing, a surface materials tester was used to probe the sample for mechanical properties of the sample. Instrumented Indentation Testing was performed by pressing an indenter into the surface while controlling and measuring the force and displacement. The results are shown in Table 1.

TABLE 1

| Sample | Hardness (HV) | Elastic Modulus (GPa) |
|---|---|---|
| Example 1 | 0.009672 | 6.170168 |
| Comparative Example | 0.005932 | 4.818346 |

As shown in Table 1, Example 1 results in a greater hardness and a greater elastic modulus as compared to the Comparative Example.

Method of use precursor cement slurry downhole

One or more embodiments relate to methods of cementing an annular space within a wellbore. The method may include providing the precursor cement slurry as previously described, introducing the precursor cement slurry into the annulus space of the wellbore, and maintaining the wellbore such that the precursor cement slurry cures into the product cement in the annular space.

Introducing the precursor cement slurry into an annulus may include introducing a cement slurry into the annulus between a casing and a wellbore, a first casing and a second casing, or a production tube and a casing, for example. The precursor cement slurry may be formulated and manufactured in accordance with any of the embodiments previously described.

In one or more embodiments, the precursor cement slurry is positioned between a wellbore wall and a casing. In one or more embodiments, the precursor cement slurry contacts both the wellbore wall and with the surface of the casing, such as the exterior surface of the casing.

In one or more embodiments, the precursor cement slurry is positioned between a first casing and a second casing. In one or more embodiments, the precursor cement slurry contacts both the surface of the first casing, such as the interior surface of the first casing, and the surface of the second casing, such as the exterior surface of the second casing.

In one or more embodiments, the precursor cement slurry is positioned between a casing and a production tube. In such embodiments, the precursor cement slurry contacts both the surface of the casing, such as the interior surface of the casing, and the surface of the production tube, such as the exterior of the production tube.

Cementing is performed when the precursor cement slurry is introduced into the wellbore via pumps. In doing so, the precursor cement slurry displaces the wellbore fluid, such as spacer fluid or drilling fluid, located within the annular space of the wellbore to be cemented.

The cement slurry flows from the surface to the bottom of the wellbore through the casing or production tube it is securing, which has already been positioned in the wellbore where it will be fixed. The cement slurry rounds the downhole edge of the casing or production tube, and then flows uphole into the annular space until it has reached a desired cementing position. After being positioned, the precursor cement slurry filling the annular space is maintained such that it cures into a solid, hardened mass: a cement matrix. The cement matrix forms a fluid-tight seal so that materials either uphole or downhole from the cement-sealed portion of the annular space cannot be bypassed. The cement matrix also provides mechanical support to the casing or production tube to which it is attached, utilizing another casing or the wellbore wall to secure the newly cemented casing or tube.

In one or more embodiments, a spacer fluid may be used in the well formation upstream of the precursor cement slurry. The spacer fluid may fluidly separate the wellbore fluid from the precursor cement slurry to prevent cross-contamination. The spacer fluid may also clean the walls of the production tube, casing, and the wellbore, and ensure that the surfaces to be bonded by the cement are water wet.

In one or more embodiments, maintaining the wellbore to permit the cement slurry to cure may refer to permitting the cement slurry under suitable conditions upon which the cement slurry may harden or cure. Suitable conditions may be any time, temperature, pressure, humidity, and other appropriate conditions known in the cement industry to facilitate the curing of the cement slurry into the cement downhole. In one or more embodiments, suitable curing conditions may be the ambient wellbore conditions. In one or more embodiments, curing may also involve facilitating the downhole process by introducing a curing agent to the cement slurry, providing heat or air to the precursor cement slurry, manipulating the environmental conditions of the precursor cement slurry to facilitate the chemical reactions occurring within. Often, the precursor cement slurry will fully cure into the cement due to subsurface formation conditions, temperature, and pressure, without requiring any additional external intervention. Under formation conditions, the cement slurry may cure to a strength of at least 500 psi (pounds per square inch) within less than 24 hours.

Maintaining the wellbore does not mean that no other activity is occurring associated with the wellbore. The wellbore does need to be maintained such that it remains safe and secure during the period of curing, such as by monitoring of wellbore conditions and adjusting to any unexpected changes. Tools and pipe may traverse the wellbore during this period. Wellbore fluid may be circulated, and its composition may be changed. Regardless of the other activities, the reactions occurring within the precursor cement slurry and its bonding with metal surfaces, such as casing or production tube, and non-metal surfaces, such as the wellbore wall, are not hindered and is permitted to progress in a timely manner.

Downhole cement product

One or more embodiments relate to the cured cement product. The cured cement product incorporates a cement bond enhancer having reacted with both a surface and a component in the cement matrix. In one or more embodiments, the cured cement is positioned between a wellbore wall and a casing. In such embodiments, the cement bond enhancer has separately reacted with the surface of the wellbore wall and with the surface of the casing, such as the exterior surface of the casing.

In one or more embodiments, the cured cement is positioned between a first casing and a second casing. In such embodiments, the cement bond enhancer has separately reacted with the surface of the first casing, such as the interior surface of the first casing, and with the surface of the second casing, such as the exterior surface of the second casing.

In one or more embodiments, the cured cement is positioned between a casing and a production tube. In such embodiments, the cement bond enhancer has separately reacted with the surface of the casing, such as the interior surface of the casing, and with the surface of the production tube, such as the exterior of the production tube. The reaction between the cement bond enhancer and the surface of the casing may result in a combination of interactions such as dipole-dipole, induced dipole, and electrostatic interactions.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" and variations thereof means that the subsequently described event or circumstances may or may not occur. The description includes instances where the event or circumstance occurs and instances where it does not occur.

When the word "approximately" or "about" and variations thereof are used, this term may mean that there can be a variance in value of up to ±10%, of up to 5%, of up to 2%, of up to 1%, of up to 0.5%, of up to 0.1%, or up to 0.01%.

The term "substantially" and variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of" The words "comprise," "has," and "include" and all grammatical variations thereof are each intended to have an open, non-limiting meaning that does not exclude additional elements or steps.

What is claimed:

1. A precursor cement slurry, comprising:
   a cement powder;
   water; and
   an additive, where the additive includes a cement bond enhancer and a non-aqueous fluid additive;
   where the non-aqueous fluid additive is an internal phase and the cement bond enhancer stabilizes the non-aqueous fluid additive in the form of a Pickering emulsion within the precursor cement slurry, and where the cement bond enhancer is comprised of the reaction product of graphene oxide with an anchoring functionality.

2. The precursor cement slurry of claim 1 where the additive further comprises a polymer.

3. The precursor cement slurry of claim 1 where the additive further comprises a superplasticizer.

4. The precursor cement slurry of claim 1 where the non-aqueous fluid additive comprises a hydrocarbon solvent.

5. The precursor cement slurry of claim 1 where the cement powder comprises Saudi Class G Portland Cement.

6. The precursor cement slurry of claim 1, wherein the cement bond enhancer is mono-facial.

7. The precursor cement slurry of claim 1, wherein the cement bond enhancer is bi-facial.

8. The precursor cement slurry of claim 1, wherein the cement bond enhancer is a reaction product of graphene oxide and (3-aminopropyl)triethoxysilane.

9. The precursor cement slurry of claim 1, wherein the cement bond enhancer is a reaction product of graphene oxide and (3-glycidyloxypropyl)trimethoxysilane.

10. A method of forming a precursor cement slurry, comprising:
   introducing into a cement powder a dry additive that is not a cement bond enhancer such that a dry mixture forms;
   introducing a water-soluble fluid additive and the cement bond enhancer into a water such that a wet suspension forms, where the cement bond enhancer is comprised of the reaction product of graphene oxide with an anchoring functionality;
   introducing a non-aqueous fluid additive into the wet suspension such that a Pickering emulsion forms, where the non-aqueous fluid additive is an internal phase and the cement bond enhancer stabilizes the non-aqueous fluid additive and; and
   introducing the dry mixture into the Pickering emulsion such that the precursor cement slurry forms.

11. The method of claim 10 where the dry additive that is not a cement bond enhancer includes a polymer.

12. The method of claim 10 where the water-soluble additive that is liquid includes a superplasticizer.

13. The method of claim 10, wherein the cement bond enhancer is mono-facial.

14. The method of claim 10, wherein the cement bond enhancer is bi-facial.

15. The method of claim 10, wherein the cement bond enhancer is a reaction product of graphene oxide and (3-aminopropyl)triethoxysilane.

16. The method of claim 10, wherein the cement bond enhancer is a reaction product of graphene oxide and (3-glycidyloxypropyl)trimethoxysilane.

17. A method for cementing an annular space within a wellbore: comprising:
   introducing a precursor cement slurry into the wellbore such that it is positioned in the annular space in the wellbore; and
   maintaining the wellbore such that the precursor cement slurry cures into a product cement in the annular space,
   where the precursor cement slurry comprises:
   a cement powder;
   water; and
   an additive, where the additive includes a cement bond enhancer and a hydrocarbon solvent;
   where the hydrocarbon solvent is an internal phase and the cement bond enhancer stabilizes the hydrocarbon solvent in the form of a Pickering emulsion within the precursor cement slurry and where the cement bond enhancer is comprised of the reaction product of graphene oxide with an anchoring functionality.

18. The method of claim 17 where the precursor cement slurry is positioned in the annular space formed between a wellbore wall and a casing.

19. The method of claim 17 where the precursor cement slurry is positioned in the annular space formed between a first casing and a second casing.

20. The method of claim 17 where the precursor cement slurry is positioned in the annular space formed between a production tube and a casing.

21. The method of claim 17, wherein the cement bond enhancer is mono-facial.

22. The method of claim 17, wherein the cement bond enhancer is bi-facial.

23. The method of claim 17, wherein the cement bond enhancer is a reaction product of graphene oxide and (3-aminopropyl)triethoxysilane.

24. The method of claim 17, wherein the cement bond enhancer is a reaction product of graphene oxide and (3-glycidyloxypropyl)trimethoxysilane.

* * * * *